May 2, 1967        W. R. HELLER ETAL        3,317,266

ELECTROCHROMIC LIGHT VALVE

Filed May 16, 1963

INVENTORS

WILLIAM R. HELLER
JUNJI KUMAMOTO
JOHN J. R. LUZZI
JOHN C. POWERS, JR.

BY

ATTORNEY

3,317,266
ELECTROCHROMIC LIGHT VALVE

William R. Heller, Pound Ridge, Junji Kumamoto, Yorktown Heights, John J. R. Luzzi, Carmel, and John C. Powers, Jr., Hartsdale, N.Y., assignors to International Business Machines Corporation, New York, N.Y., a corporation of New York
Filed May 16, 1963, Ser. No. 280,994
27 Claims. (Cl. 350—160)

The present invention relates to materials which exhibit a pronounced electrochromic effect and to devices fabricated therefrom. More particularly, it relates to a class of such materials which may be utilized in apparatus to modulate light waves.

The present invention constitutes an improvement over that disclosed in copending U.S. patent application Serial No. 152,584, filed Nov. 15, 1961, of W. R. Heller et al., now Patent No. 3,215,038. A general description of light switching or modulating by using an electric field induced Stark shift of absorption band edges is presented in copending U.S. patent application Serial No. 152,587, filed Nov. 15, 1961, of W. R. Heller now Patent No. 3,238,843.

In modern scientific technology there are many areas where optical devices have wide potential utility. In the field of communications, for example, the use of microwaves as a means for carrying information is widespread and in this connection with the recent development of the "laser," electromagnetic waves in the visible spectrum or light waves are being used as information carriers. In all sorts of data display systems light waves are the ultimate means of communicating the data to be displayed to an observer. Also, there have been proposed numerous types of optical computing circuits utilizing electroluminescent cells, photoconductors and the like. All of these systems require the control of light waves rapidly and efficiently. A basic component of such a system is a simple on-off switch or, in a more advanced system, a device for modulating the light beam. In the past, mechanical devices such as shutters, diaphragms and the like have been utilized for the purpose of passing or interrupting a light beam, however, in the areas designated above, for optimum utilization the speeds with which the light beams must be shut off or otherwise interrupted are extremely great and normal mechanical means are not satisfactory for handling such speed requirements. The problem of modulation is even greater than on-off switching. One of the few actual modulation schemes is the use of a graded density filter which is interposed in the light beam a different distance depending on the modulation desired. The mechanical drive for such a system places severe limitations on the upper operated frequency response of such a system.

In recent years a number of devices have been developed for controlling the passage of a light beam by non-mechanical or electrical means. One of the more common utilizes the Kerr effect. Such an apparatus comprises two light polarizers, each of which is capable of limiting the transmission of light therethrough to light whose polarization is in substantially one plane. The light polarizers are usually positioned such that the axis of polarization of each is displaced with respect to each other by about 90°. Between the polarizers there is positioned an electro-optical material which displays birefringent properties upon the application of an electric field and hence rotates the plane of polarization of the polarized light passing therethrough. The angles of polarization of the light polarizers can be so arranged that, when a voltage is applied to the electro-optical material, polarized light entering the electro-optical material from the first polarizer is, in effect, rotated to the polarization angle of the second polarizer so that the light is transmitted through the second polarizer. If the electric field is not applied and rotation of the plane of polarization does not occur, the cooperative action of the two polarizers is effective, as is well known, to prevent the transmission of light through the second polarizer. Such a system of light switching is set forth and described in U.S. Patent 2,909,972. These systems, while operable, are physically complicated, bulky, expensive to manufacture and moreover, they do not readily lend themselves to miniaturization, that is where it might be desired to have a large number of such elements within a small space. The miniaturization aspect can be quite important in computer applications in the communications field, and also where a matrix type of visual display is anticipated.

Past efforts to develop a suitable and efficient electro-optical element have for the most part been unsuccessful with the exception of the electrochromic devices referred to in the above identified copending U.S. patent applications. These devices involve, generally, the action of a strong electric field upon the spectral lines of a material subjected to its influence. For example, the Stark effect was originally observed in gases and only recently has been seen in certain solids. The usual observed effect is a shift in wavelength of some portions of the absorption and emission spectra of the material. The above identified U.S. patent application Serial No. 152,584 discloses organic polymers exhibiting significant electrochromic effects and a specific device utilizing such a material, however, work is continually being done to ascertain even better substances, that is, substances which exhibit even greater shifts which make possible even more efficient and useful devices.

It has now been found that materials having a conjugated pi ($\pi$) electronic system and which exhibit a change in the energy gaps between two electronic states due to an applied electric field when placed in a suitable matrix exhibit pronounced electrochromic shifts upon the application of a strong electric field and may be utilized to modulate the intensity of light passing therethrough when incorporated in a suitable device. The matrix may either be a suitable solid organic solvent or the substantially pure material itself.

It is accordingly the primary object of the present invention to provide an improved light modulating scheme.

It is a further object to provide an electro-optic element whose operational speed is not affected by any mechanical considerations.

It is still a further object to provide such an element utilizing certain molecules in a suitable matrix which exhibit a pronounced electrohromic shift.

It is another object to provide a device for controlling light transmission utilizing such molecules in a suitable matrix as its active member.

The foregoing and other objects, features and advantages of the invention will be apparent from the following more particular description of preferred embodiments of the invention, as illustrated in the accompanying drawings.

The objects of the present invention are accomplished in general by an element for altering the transmission of a light beam therethrough comprising a layer of an electrochromic material which has a conjugated pi ($\pi$) electron system and which exhibits a change in the energy gap between two states due to an applied electric field. Molecules having a polarizability difference between the ground and excited state of at least 100 A.$^3$ have this latter property. The material is placed in a suitable matrix and has means associated therewith for establishing a strong electric field thereacross.

Figures 1, 2, 3:
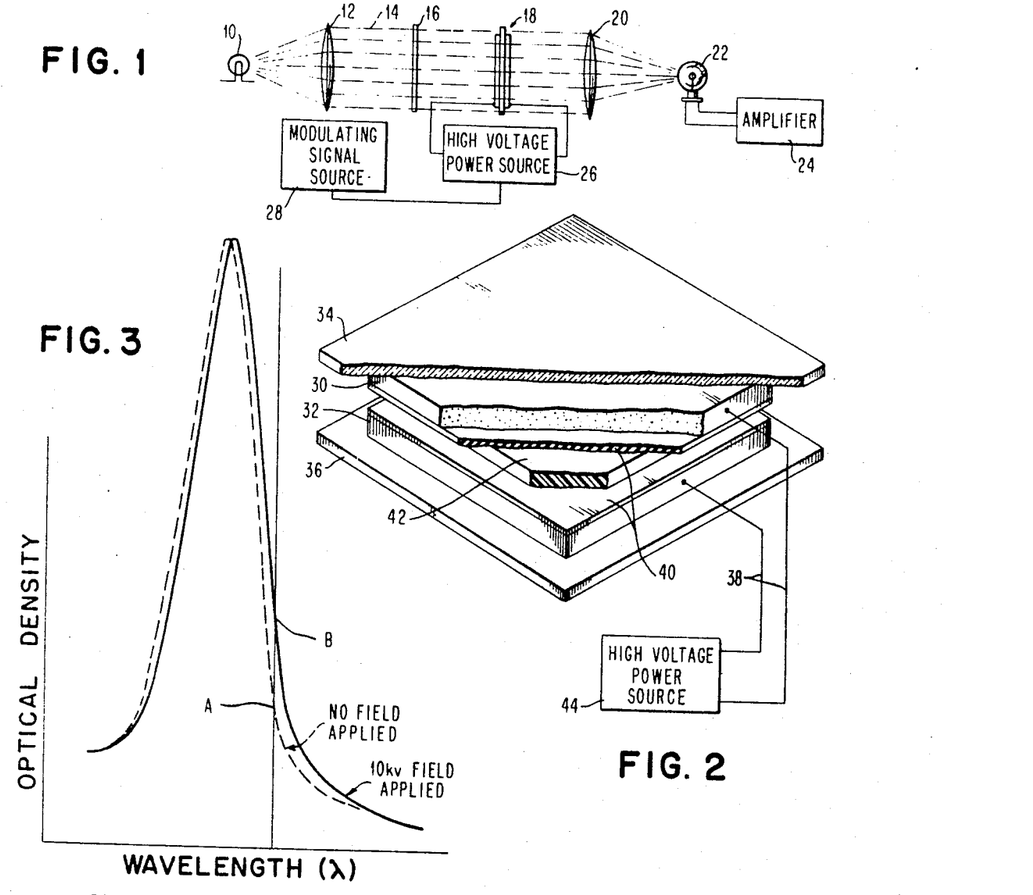
FIGURE 1 is a schematic representation of a simplified electro-optical light switching system according to the present invention.
FIGURE 2 is a graphical representation of the light transmitting mechanism of FIGURE 1 showing optical density plotted versus wavelength ($\lambda$) showing the effect of an applied electric field.
FIGURE 3 is a perspective view of an electro-optic element or device which is suitable for practice of the invention.

These materials, when utilized in the light modulating configuration or apparatus shown in FIGURE 1, exhibit strong electrochromic properties and are capable of achieving up to twenty percent modulation of an impinging monochromatic light beam. Suitable biasing of a pick-up device and its amplifier also renders the element capable of performing on-off switching.

The apparatus disclosed in the two above identified copending U.S. patent applications may be used in practicing the present invention. Reference may be made to those applications for a detailed description of their theory of operation. U.S. patent application Serial No. 152,587 specifically derives the theory for the electronic interactions which produce the electrochromic effect.

FIGURE 1 illustrates schematically a simplified light modulation system in which a monochromatic light source 10 causes light to shine upon collimating lens 12 which forms the parallel light beam 14 which further passes through an interference filter 16 for the purpose of filtering out all but the light of the desired frequency. The light beam 14 passes through the electro-optic switching element 18, then through condensing lens 20 and falls upon a photosensitive device 22 such as a photocell. When no electric field is applied to the element 18, light of a first intensity reaches the photocell 22 and when an electric field is applied to the member 18, light of a different intensity reaches photocell 22, as will be understood from the above discussion. The amplifier detector unit 24 is suitably chosen so that, for example, when light of a first intensity falls on photocell 22 no signal will be developed and when light of a different intensity falls upon said photocell a signal will be developed. Such a system may either be used as a simple light modulator or as an on-off switching element for performing optical logic. In the latter, when a signal is fed to the element 18, a signal either will (1) or will not (0) be developed at the output of the amplifier 24. Such a device has the additional advantage of complete electrical isolation between the input to the power supply which would receive the signal to be applied to the element 18 and the output of the amplifier 24. The modulating ability or flexibility is enhanced by the fact that the optical density is approximately proportional to the square of the field applied to the electro-optical element by the high voltage source 26 by a suitable modulating signal source 28.

Figure 4:
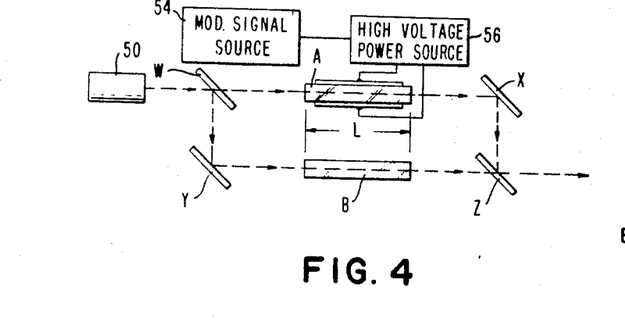
FIGURE 4 is a schematic view of another apparatus embodiment suitable for modulating a light beam using wave interference phenomena.

The details of a specific electro-optic element suitable for use with either the system of FIGURE 1 or of FIGURE 4 is shown in FIGURE 2. In the embodiment of FIGURE 2, films of conducting gelatin 30 and 32 were cast upon glass slides 34 and 36, said films having thin copper wires 38 connected thereto. The above conducting gelatin is prepared by dissolving seven grams of gelatin in forty milliliters of hot water. Four grams of lithium chloride are added to the solution. The mixture is spread onto the desired surface, and allowed to stand until the gelatin has set. A thin (1 mil) Mylar (polyethylene terephthalate) film 40 was next applied to the surface of both the gelatin films 30 and 32 and a layer of electro-optic material 42 sandwiched therebetween. A suitable high voltage power supply 44 is connected to the wires 38 and supplies the electric field for energizing the device.

It is to be understood that the transparent electrodes could be formed in other ways well known in the art. For example, a stannic oxide ($SnO_2$) film which is conductive may be deposited upon the surface of two glass slides and by heating $SnCl_2$ powder in air in a manner well known in the art. A specific description of this process appears in the Journal of the Optical Society of America, vol. 48, No. 11, November 1958 on page 857. The only criteria that such conductive electrodes must satisfy to function with the present invention are that they be electro-optically inert and characterized by the fact that their absorption spectra does not in any way interfere with the operation of the device.

The optical characteristics of the device of FIGURE 2 are shown in the plot of FIGURE 3. In this figure, optical density is plotted versus wavelength for the two conditions of applying an electric field and not applying an electric field. The dotted line is a plot with no electric field applied to the electro-optic element and the solid line is a plot wherein a 10 kv. field is applied to the two electrodes. The vertical distance A—B is a measure of the change in optical density produced by the electric field. The data used for plotting the curve of FIGURE 3 were obtained using a Cary Model 14 spectrophotometer manufactured by the Applied Physics Corp. as a light source, passing said light through the specimen which is placed in the spectrophotometer and measuring the transmitted light.

FIGURE 4 is a schematic representation of a light modulator using wave interference phenomena. The use of such interferometers for the purposes of measuring speed of light, wavelength, etc., is well known in the optical arts. The apparatus includes a monochromatic light source 50, and a first beam splitter W of any well known type adapted to substantially equally divide the output of the monochromatic light source between the two optical paths. Mirrors X and Y perform the obvious functions of directing the light beams for unit A and unit B respectively, to set up the equal length light paths WXZ and WYZ. The member Z is likewise another well known unit similar to W for combining the light from units A and B into a single output beam where the interference phenomenon may be observed. As stated above, the overall light paths WXZ and WYZ are of equal length as are the lengths of the two optical elements A and B. Thus, assuming the elements A and B are identical optically, that is, have the same refractive index, the light output from element Z will be the result of the addition of the two light beams since the beams entering Z are in phase. It will be seen that electrodes 50 and 52 are mounted on element A. However, either of the elements A or B could be utilized as the active element in such a scheme. The elements themselves could be the same or substantially the same as that shown in FIGURE 2. The light path, through the electrochromic material 42 could alteratively be in a direction parallel to the electric field, i.e., electrodes 30 and 32 mounted on the ends of unit A. In this embodiment the electrodes, of course, would have to be transparent in nature.

As explained in detail in copending U.S. patent application Serial No. 152,587, the index of refraction of electrochromic materials, e.g., those exhibiting a Stark shift, changes upon the application of a strong electric field. This change, as is explained in this prior application in detail, effects a change in the coefficient of absorption and thus the optical density of the material which latter property is the specific one utilized in the simple modulation scheme of FIGURE 1. However, for the embodiment of FIGURE 4, the change of refractive index in and of itself is utilized to effect a change in the optical path length of the path WYZ in the interferometric modulator. As is well known in the field of optics, the refractive index is a measure of the speed of light in a given medium with respect to the speed in air or more specifically, in a vacuum. Thus, assuming that the two elements A and B, when A is not under the influence of the electric field, have the same refractive index and are the same length, the speed of light therethrough is the same and thus, the effective optical path length is the same; however, when an electric field is applied to the element A, the index of refraction changes, thus, changing the speed of light in said medium so that the effective length of the light path therethrough varies with respect to that of B. Thus, under the condition with field applied when the effective light path length difference between A and B equals λ/2 and λ is the wavelength of the monochromatic light source, the two beams combining at Z will be 180° out of phase and will completely cancel each other out, thus giving one hundred percent modulation of the output beam.

It will be readily understood that various combinations of the optical path length through the active element A as well as the voltage gradient applied across the material will effect the change of index of refraction and total effective path length difference.

It would be obvious to one skilled in the art to arrange the devices so that the effective optical path lengths would be equal with field applied and out of phase with no field. Also, it will be understood that the specific path lengths may be different as long as the phase relationship of the two recombining beams set forth above are obtained. Thus, it is only necessary in a simple device to use a single electro-optic element. It will be readily understood that suitable lengths L could be chosen for A and B and suitable voltages applied to provide one hundred percent modulation as the maximum modulating point and lesser voltages applied to achieve lower modulating levels. In such a system, of course, the modulating signal would be applied as from a source 54 and thus modulate the output of the high voltage power source 56.

The following discussion indicates the switching or modulating effectiveness possible with the interferometric modulator of the invention.

Assuming that a beam of light can be split and made to recombine by ordinary beam splitting techniques as set forth above, then the resultant can be made to amount to constructive or destructive interference at a suitable focal point or plane, if the optical path length (O.P.) of one of the beams is changed by one half wave λ/2, thus, $$\Delta(O.P.) = \Delta n \cdot L = \lambda/2$$

where L is linear path length and λ is wavelength of the light being transmitted and $n$ is index of refraction. If the electric field is turned on and off at a frequency $f$ and the dimensions of the film in the field are $$t \times h \times L$$

then the power loss in the device is $$2\pi f \chi'' F^2 th L / 8\pi$$

where $\chi''$ is the loss tangent of the material. A figure of merit for the device is then $$\frac{\Delta n \cdot L}{2\pi f \chi''(F^2/8\pi)Lth} = \frac{4\Delta n}{f \chi'' F^2 th}$$

which is indepedent of applied field when the field dependence of $\Delta n$ is taken into account.

For this dye in polystyrene, which has $$\chi'' = 0.8 \times 10^{-3}$$

and for convenient dimensions $t = 0.01$ cm.
$L = 10$ cm.
$h = 1$ cm.

we get an optical path difference of λ/2 at 6000 A. when the field is 5000 volts/cm., the applied voltage 50 volts and the losses negligible for frequencies less than $10^9$ c.p.s.

Devices using this change of index of refraction have an important advantage in that the application of field may be made *transverse* to the direction of the spectral path. Then the power loss can be made as small as allowed by the fact that the focused light beam must have an area less than $t \times h$. A further advantage is that the volume of the specimen can be reduced so that the heat transfer away from the specimen can be made more effective. This is very important in the modulation of light at radio or microwave frequencies.

It is possible to apply the electric field to the electrochromic devices in a number of different ways. The most obvious manner is by means of electrical contacts and mechanical switch actuating means. However, for high frequency applications this is completely unfeasible. For intermediate frequencies, conventional electronic switching circuits may be used and for even higher frequencies, the electrochromic material may be placed in a microwave circuit such as a cavity or waveguide and the electric field produced therein utilized to establish the necessary voltage gradient across the material. It is, of course, obvious from the above discussion that either A.C. or D.C. fields may be utilized with the disclosed devices and systems.

Having thus described typical apparatus capable of modulating and/or switching a light beam by absorption as well as the novel interferometric modulator of FIGURE 4 utilizing electrochromic materials, a description of the materials which have been found to exhibit novel electrochromic effects will now be described.

It has been found that materials having the following physical properties exhibit pronounced electrochromic effects.

(1) The compound must have a conjugated pi ($\pi$) electron system. Such a system is defined as one in which the pi electrons of a double bond consist of only the electrons which occupy the overlapping p lobes and do not include the sigma bonding electrons. It is possible for a non-bonding electron or electrons to become conjugated with these pi electrons by mutual overlap of their respective orbitals. For a further more detailed description of such a system, reference is made to "Structure and Mechanism in Organic Chemistry" by C. K. Ingold, Cornell University Press, 1953, page 26 ff. The effective chain length of a conjugated system is determined by the number of collinear carbon and possibly nitrogen, sulfur, or oxygen atoms which allow easy electron transfer (alternation in location of double bonds in the structural formula). When aromatic rings make up part of the chain, only those atoms of the ring are included in computing the length which continue the chain without closing the ring. If a ring occurs at a chain end, one ends a count when one reaches the carbon atom furthest from the link connecting the ring to the original chain.

(2) The material must exhibit a change in the energy gap between two electronic states due to an applied electric field.

One criteria of the second condition requires a polarizability difference between the ground and excited states of at least 100 A.³. It is noted that this difference can be maximized by choosing molecules having localized electrons in the ground state and delocalized electrons in the excited state.

It should be noted that there is evidence, all things being equal, to indicate that greater chain length of the conjugated system enhances the above described difference in polarizability. It is also advantageous based on the evidence of all of the compounds listed in Table I that the system have a structural asymmetry as explained below.

It is further very advantageous from a device standpoint that the electrochromic material be a good insulator. In such case, higher electric fields may be established across the device without providing for insulating layers.

When the molecule in question is symmetrical (e.g., has a center of inversion), the localization of electrons in the ground state cannot be as effective as it is when only the one most highly electronegative substituent is present. Hence, the change in polarizability (and increase in delocalization) from ground to excited state is less marked.

Therefore, strong asymmetry of the localization in the molecule leads to a more pronounced change in polarizability.

The following is a specific example of an electrochromic substance designated chemically as:

ω-(N'-methylpyridyl-4')-N,N-dimethyl-4-aminostyrene iodide

This substance will be referred to as (L) for the sake of easy reference in the remainder of the specification. The substance (L) was prepared in two steps: (1) γ-picoline was N-methylated by addition of methyl iodide to give the salt, n-methyl-γ-picolinium iodide. (2) The salt was condensed with N,N-dimethyl-p-aminobenzaldehyde with the aid of some piperidine as a catalyst. The product, (L), was crystallized from methanol.

Ionic materials of this type were found to be incompatible with polystyrene. A more polar matrix material was needed for examining this class of material. Therefore, the more polar matrix, cellulose acetate, was tested with 4-dimethylamino-4'-nitrostilbene. The matrix was found to be useable with fields up to $5 \times 10^5$ volts/cm. This new dye, (L), was tested at 5500 A. in cellulose acetate and a twenty percent change in optical density, which corresponds to a shift of about 38 A., was observed for a field of $5 \times 10^5$ volts/cm.

Another example of a suitable electrochromic material is quinaldine red:

Another example is:

4-dimethylamino-4'-nitrostilbene

This material has been found very practical in such an apparatus as disclosed in FIGURES 1 and 4 of the drawings. The stilbene has a peak in its absorption spectrum in the neighborhood of 4500 A. At 5100 A. the application of a field of $10^6$ volts/cm. results in a shift to the red of about 20 A. The changes in optical density are of the order of 0.1 to 0.15 at a total sample density of 1.1 to 1.3, thus, the change is better than ten percent of the optical density. The use of thinner films will, of course, allow the application of fields up to twice those referred to above. Since the effect is dependent upon the square of the applied field, it is believed that changes of up to twenty-five percent of the working optical density are easily practicable.

Yet another example of a suitable electrochromic material is:

2-amino-7-nitro fluorene

This material has been found to be very active in its electrochromic response. When placed in a polystyrene matrix, it has a maximum shift in the neighborhood of 3900 A. A change in optical density of fifteen percent has been found for a field of $10^6$ volts/cm. at 4400 A. A similar large shift has been noted on the blue side of the band.

Table I below illustrates the results of experimental measurements made on a large number of materials following with the definition set forth previously. The table indicates an accepted chemical name, the structure, the material in which the electrochromic material was dispersed to form the matrix, if not pure, the optical density (O.D.) the percent change in O.D., the magnitude of the field (F) applied and the shift of the band edge in angstroms (A.). These tests were made on a Cary Model 14 spectrophotometer manufactured by the Applied Physics Corp.

TABLE I

| Compound | Matrix | $\lambda_{max.}$ (A.) | $\lambda_{obs.}$ (A.) | O.D. | $\Delta$O.D./O.D. | Field $\times 10^{-6}$ (v./cm.) | Shift (A.) |
|---|---|---|---|---|---|---|---|
| ω-(N'-methylpyridyl-4')-4-dimethylaminostyrene iodide | CA | 4,750 | 5,200 | 0.81 | .08 | .43 | 21 |
| N-methylpyridine-4-carboxaldehyde, 4'-dimethylamino anil iodide | CA | 5,000 | 5,600 | 0.52 | .06 | .36 | 22 |
| ω-(N'-betainepyridyl-4')-4-dimethylaminostyrene | CA<br>MMA | 4,700<br>4,600 | 5,300<br>5,200 | 1.80<br>1.7 | .02<br>.05 | .25<br>.45 | 7<br>15 |
| ω-(N'-methylpyridyl-2')-4-dimethylaminostyrene iodide | CA | 4,500 | 5,250 | 1.07 | .03 | .2 | 5 |
| 4-dimethylamino-4'-nitrostilbene | PS<br>PS | 4,400 | 5,300<br>5,100 | 0.37<br>1.19 | 0.45<br>0.10 | 1.7<br>1.0 | 45<br>16 |

TABLE I—Continued

| Compound | Matrix | $\lambda_{max}$ (A.) | $\lambda_{obs}$ (A.) | O.D. | $\Delta$O.D./O.D. | Field $\times 10^{-6}$ (v./cm.) | Shift (A.) |
|---|---|---|---|---|---|---|---|
| N,N-dimethyl-N'-(4-nitrobenzylidene)-p-phenylenediamine $(CH_3)_2N-\bigcirc-N=CH-\bigcirc-NO_2$ | PS | 4,500 | 5,400 | 0.46 | 0.11 | 1.4 | 17 |
| 4'-dimethylaminobenzaldehyde, 4-nitro anil $(CH_3)_2N-\bigcirc-CH=N-\bigcirc-NO_2$ | PS | 4,000 | 4,400 | 1.79 | 0.02 | 1.0 | 03 |
| 4-dimethylamino-4'-nitroazobenzene $(CH_3)_2N-\bigcirc-N=N-\bigcirc-NO_2$ | PS | 4,800 | 5,350 | 1.40 | 0.07 | 1.0 | 15 |
| ω-(2'-methyl-3'-nitropyridyl-6')-4-dimethylaminostyrene $(CH_3)_2N-\bigcirc-CH=CH-\bigcirc_{CH_3}^{NO_2}$ | PS<br>PS<br>Pure Material. | 4,500<br><br>4,650 | 5,300<br>5,400<br>5,300 | 0.54<br>0.29<br>.72 | 0.06<br>0.37<br>0.7 | 0.75<br>0.05<br>2.3 | 10<br>45<br>25 |
| 2-amino-7 nitrofluorene $H_2N-\bigcirc\bigcirc-NO_2$ | PS | 3,900 | 4,400 | 1.08 | 0.15 | 0.9 | 45 |
| 4-amino-4'-nitrobiphenyl $H_2N-\bigcirc-\bigcirc-NO_2$ | PS | 3,750 | 4,150 | 0.88 | 0.01 | 0.8 | 02 |
| 2-dimethylamino-7-nitrofluorene $(CH_3)_2N-\bigcirc\bigcirc-NO_2$ | PS | 4,200 | 4,750 | 0.90 | 0.025 | 0.75 | 6–7 |
| ω-(N'-methyllepidyl-4')-4-dimethylaminostyrene iodide $(CH_3)_2N-\bigcirc-CH=CH-\bigcirc_{N-CH_3}^{I}$ | CA | 5,300 | 6,000 | 1.28 | .05 | .31 | 17 |
| N-methyllepidyl-4-carboxaldehyde, 4'-dimethylamino anil iodide $(CH_3)_2N-\bigcirc-N=CH-\bigcirc_{N-CH_3}^{I}$ | CA | 5,600 | 6,400 | .68 | .06 | .37 | 22 |
| 2'',3-dehydro-1-(N'-methylpyridyl-4')-3-(1'',3'',3''-trimethylinodoline-2'') propylene. $\bigcirc_{N-CH_3}^{CH_3\ CH_3}=CH-CH=CH-\bigcirc_{N-CH_3}^{I}$ | CA | 5,300 | 5,650 | 1.63 | .10 | .25 | 10 |
| 4-methoxy-4'-nitrostilbene $CH_3-O-\bigcirc-CH=CH-\bigcirc-NO_2$ | PS | 3,800 | 4,300 | .45 | .04 | 1.3 | 7–8 |
| 4-hydroxy-4'-nitrostilbene $H-O-\bigcirc-CH=CH-\bigcirc-NO_2$ | PS | 3,800 | 4,300 | 1.40 | .04 | 1 | 8 |
| 4'-nitrobenzaldehyde, 4-hydroxy anil $H-O-\bigcirc-N=CH-\bigcirc-NO_2$ | PS | 3,850 | 4,500 | .44 | .03 | .9 | 5 |

TABLE I—Continued

| Compound | Matrix | $\lambda_{max.}$ (A.) | $\lambda_{obs.}$ (A.) | O.D. | $\Delta$O.D./O.D. | Field $\times 10^{-6}$ (v./cm.) | Shift (A.) |
|---|---|---|---|---|---|---|---|
| 2-hydroxy-7-nitrofluorene | PS | 3,700 | 4,150 | .71 | .015 | .77 | 3 |
| N-acetyl-4-amino-4'-nitrostilbene | PS | 3,800 | 4,300 | .45 | .05 | 1.1 | 7 |
| N,N-dimethyl-N'(4-cyanobenzylidene)-4-phenylenediamine | PS | 4,300 | 4,800 | .44 | .02 | .5 | 2 |
| ω-(N'-methylpyridyl-4')-4-methoxystyrene iodide | CA | 3,900 | 4,300 | 1.19 | .02 | .3 | 2.5 |
| ω-(N'methylpyridyl-4')-4-(N-acetylamino)-styrene iodide | CA | 3,900 | 4,400 | .70 | .01 | .3 | 2 |
| Quinaldine red | CA | 5,250 | 5,850 | .87 | .05 | .5 | 10 |

Further compounds suitable for practice of the invention and exhibiting the physical properties enumerated above are:

4-sulfhydryl-4'-nitrostilbene 4-(S-methylsulfhydryl)-4'-nitrostilbene 2-sulfhydryl-7-nitrofluorene

Most of the electrochromic compounds of Table I fall within the general formulas set forth below:

where:
$R_1$ or $R_2$ may be selected from the groups consisting of hydrogen, alkyls, aryls, acyls, aryl alkyls and alkyl aryls.

Typical members of these radical groups are:
Methyl, ethyl, propyl, cyclopentyl, cyclohexyl, phenyl, xylyl, formyl, acetyl, propionyl, benzoyl, β-phenyl ethyl, benzyl, methylphenyl, ethylphenyl.

$R_3$ may be chosen from, for example, the groups consisting of:

An important additional aspect of all of these compounds is that they are particularly suited for use in polystyrene as well as other matrices such as polymethylmethacrylate, polyvinyl acetate, cellulose acetate, etc., operating as electro-optic modulating elements utilizing a change of refractive index in the interference modulator disclosed in FIGURE 4. It should be noted that the materials should operate at the wavelength ($\lambda$) which maximizes the change in refractive index with field. For the material $\omega$-(2'methyl-3'-nitropyridyl-6')-4-dimethylaminostyrene, for example this optimum wavelength lies at approximately 1.4 times the wavelength ($\lambda$) of the nearby maximum in absorption. The reason for this is that the difference of the quantities $S_F$ and $S_0$ described below depends upon the parameters $\lambda_{max.}$, $\lambda_{obs.}$ and $\omega_1$ as well as the applied electric field F. This dependence can best be defined by a numerical table which must be obtained for each individual compound.

The formula providing a quantitative approximation of the change of refractive index ($\Delta n$) may be written as follows:

$$\Delta n = \frac{ck_0 f_m}{2\pi\alpha}[S_F - S_0]$$

$\Delta n$ = change in index of refraction observed at an angular frequency $\alpha$
$c$ = speed of light in a vacuum
$f_m$ = molar concentration of the dye
$\alpha = 2\pi c/\lambda$ where $c$ is speed of light in a vacuum
$k_0$ = an absorption coefficient at the frequency $\alpha$ derived from the term: $k = k_0 \cdot g(\omega) \cdot f_m$ $$g(\omega) = e^{-(\omega-\omega_0)^2/\omega_1^2}$$

$k$ = the absorption coefficient in reciprocal centimeters
$\omega_0$ = angular frequency at the center of the absorption band
$\omega_1$ = the half width angular frequency of the absorption band
$\omega$ = an integration variable
$S_F$ = a numerical function of the electric field involving the parameters ($\alpha$, $\omega_0$, $\omega_1$ and $f$)
$S_0$ = the same function as $S_F$ but without field An example of the use of this formula is the result for the crystalline form of compound $\omega$-(2'-methyl-3'-nitropyridyl-6')-4-dimethylaminostyrene above:

$$\Delta n = 3 \times 10^{-18} \times F^2$$

where:
$\lambda_{obs.} = 5400$ A.
F is expressed in volts/meter

An additional advantage of this class of materials is their relative temperature insensitivity compared to other light modulating systems since a temperature difference of a degree is required to produce an effect on the index comparable to a field of 500,000 volts/cm. at $$n_0 = 10^{20}/cm.^3$$

This value, of course, suggests operation at fields much higher than 5000 volts/cm., to avoid temperature control problems.

Further, the index change of the polystyrene matrix with temperatures goes in the opposite direction and tends to compensate for the index change due to temperature shift of the absorption peak of the electrochromic material.

It will be readily appreciated from the above examples that a relatively large number of examples have been tested to determine the magnitude of their electrochromic effect. Materials having the characteristics set forth will perform quite satisfactorily in the light modulating type of apparatus set forth and described herein.

A number of matrices have been found suitable. These include combinations of the electrochromic material with polystyrene (PS), polymethylmethacrylate (MMA), polyvinyl acetate (PVA), cellulose acetate (CA) and the like as well as the dye material itself. As stated above, in several of the examples, all of the materials may not be compatible with all of the matrix materials; however, this incompatibility would be apparent to anyone skilled in the art immediately on attempting to make such a device. Therefore, a listing of the particular combinations which can will not be attempted.

It is also possible to fabricate a light switching or modulating device according to the present invention from sheets of the pure electrochromic materials. This structure allows much higher voltage gradients to be established across the element with lower total applied voltages. It should also be noted that the quantity $f_m$ in the above formula for determining $\Delta n$ is maximized for this condition.

In summary, the light modulation technology, especially in the radio frequency, microwave and higher frequency areas has never been greatly explored or successfully achieved and it apepars that devices of the type set forth herein utilizing the class of materials disclosed show great promise in communications and other fields.

While the invention has been particularly shown and described with reference to preferred embodiments thereof, it will be understood by those skilled in the art that various changes in form and details may be made therein without departing from the spirit and scope of the invention.

What is claimed is:

1. An electro-optic element for controlling the transmission of a beam of light therethrough said element comprising a matrix having therein an electrochromic material and electrode means mounted on opposite faces of said matrix for applying an electric field therebetween and wherein the electrochromic material is $\omega$-(N'-methyl-pyridyl-4')-4-dimethylaminostyrene iodide whose structural formula is:

2. An electro-optic element for controlling the transmission of a beam of light therethrough said element comprising a matrix having therein an electrochromic material and electrode means mounted on opposite faces of said matrix for applying an electric field therebetween and wherein the electrochromic material is N-methylpyridine-4-carboxaldehyde, 4'-dimethylamino anil iodide whose structural formula is:

3. An electro-optic element for controlling the transmission of a beam of light therethrough said element comprising a matrix having therein an electrochromic material and electrode means mounted on opposite faces of said matrix for applying an electric field therebetween and wherein the electrochromic material is ω-(N'-betaine-pyridyl-4')-4-dimethylaminostyrene whose structural formula is:

4. An electro-optic element for controlling the transmission of a beam of light therethrough said element comprising a matrix having therein an electrochromic material and electrode means mounted on opposite faces of said matrix for applying an electric field therebetween and wherein the electrochromic material is ω-(N'-methylpyridyl-2')-4-dimethylaminostyrene iodide whose structural formula is:

5. An electro-optic element for controlling the transmission of a beam of light therethrough said element comprising a matrix having therein an electrochromic material and electrode means mounted on opposite faces of said matrix for applying an electric field therebetween and wherein the electrochromic material is 4-dimethylamino-4'-nitrostilbene whose structural formula is:

6. An electro-optic element for controlling the transmission of a beam of light therethrough said element comprising a matrix having therein an electrochromic material and electrode means mounted on opposite faces of said matrix for applying an electric field therebetween and wherein the electrochromic material is N,N-dimethyl-N'-(4-nitrobenzylidene)-p-phenylenediamine whose structural formula is:

7. An electro-optic element for controlling the transmission of a beam of light therethrough said element comprising a matrix having therein an electrochromic material and electrode means mounted on opposite faces of said matrix for applying an electric field therebetween and wherein the electrochromic material is 4'-dimethylaminobenzaldehyde, 4-nitro anil whose structural formula is:

8. An electro-optic element for controlling the transmission of a beam of light therethrough said element comprising a matrix having therein an electrochromic material and electrode means mounted on opposite faces of said matrix for applying an electric field therebetween and wherein the electrochromic material is 4-dimethylamino-4'-nitroazobenzene whose structural formula is:

9. An electro-optic element for controlling the transmission of a beam of light therethrough said element comprising a matrix having therein an electrochromic material and electrode means mounted on opposite faces of said matrix for applying an electric field therebetween and wherein the electrochromic material is ω-(2'-methyl-3'-nitropyridyl-6')-4-dimethylaminostyrene whose structural formula is:

10. An electro-optic element for controlling the transmission of a beam of light therethrough said element comprising a matrix having therein an electrochromic material and electrode means mounted on opposite faces of said matrix for applying an electric field therebetween and wherein the electrochromic material is 2-amino-7-nitrofluorene whose structural formula is:

11. An electro-optic element for controlling the transmission of a beam of light therethrough said element comprising a matrix having therein an electrochromic material and electrode means mounted on opposite faces of said matrix for applying an electric field therebetween and wherein the electrochromic material is 4-amino-4'-nitrobiphenyl whose structural formula is:

12. An electro-optic element for controlling the transmission of a beam of light therethrough said element comprising a matrix having therein an electrochromic material and electrode means mounted on opposite faces of said matrix for applying an electric field therebetween and wherein the electrochromic material is 2-dimethylamino-7-nitrofluorene whose structural formula is:

13. An electro-optic element for controlling the transmission of a beam of light therethrough said element comprising a matrix having therein an electrochromic material and electrode means mounted on opposite faces of said matrix for applying an electric field therebetween and wherein the electrochromic material is ω-(N'-methyllepidyl-4')-4-dimethylaminostyrene iodide whose structural formula is:

14. An electro-optic element for controlling the transmission of a beam of light therethrough said element comprising a matrix having therein an electrochromic material and electrode means mounted on opposite faces of said matrix for applying an electric field therebetween and wherein the electrochromic material is N-methyllepidyl-4-carboxaldehyde, 4'-dimethylamino anil iodide whose structural formula is:

15. An electro-optic element for controlling the transmission of a beam of light therethrough said element comprising a matrix having therein an electrochromic material and electrode means mounted on opposite faces of said matrix for applying an electric field therebetween and wherein the electrochromic material is 2″,3-dehydro-1-(N′ - methylpyridyl-4′)-3-(1″,3″,3″ - trimethylindoline-2″) propylene whose structural formula is:

16. An electro-optic element for controlling the transmission of a beam of light therethrough said element comprising a matrix having therein an electrochromic material and electrode means mounted on opposite faces of said matrix for applying an electric field therebetween and wherein the electrochromic material is quinaldine red whose structural formula is:

17. An electro-optic element for controlling the transmission of a beam of light therethrough said element comprising a matrix having therein an electrochromic material and electrode means mounted on opposite faces of said matrix for applying an electric field therebetween and wherein the electrochromic material is 4-sulfhydryl-4'-nitrostilbene whose structural formula is:

18. An electro-optic element for controlling the transmission of a beam of light therethrough said element comprising a matrix having therein an electrochromic material and electrode means mounted on opposite faces of said matrix for applying an electric field therebetween and wherein the electrochromic material is 4-(S-methylsulfhydryl)-4'-nitrostilbene whose structural formula is:

19. An electro-optic element for controlling the transmission of a beam of light therethrough said element comprising a matrix having therein an electrochromic material and electrode means mounted on opposite faces of said matrix for applying an electric field therebetween and wherein the electrochromic material is 2-sulfhydryl-7-nitrofluorene whose structural formula is:

20. An electro-optic element for controlling the transmission of a beam of light therethrough said element comprising a matrix having therein an electrochromic material and electrode means mounted on opposite faces of said matrix for applying an electric field therebetween and wherein the electrochromic material is 4-methoxy-4'-nitrostilbene whose structural formula is:

21. An electro-optic element for controlling the transmission of a beam of light therethrough said element comprising a matrix having therein an electrochromic material and electrode means mounted on opposite faces of said matrix for applying an electric field therebetween and wherein the electrochromic material is 4-hydroxy-4'-nitrostilbene whose structural formula is:

22. An electro-optic element for controlling the transmission of a beam of light therethrough said element comprising a matrix having therein an electrochromic material and electrode means mounted on opposite faces of said matrix for applying an electric field therebetween and wherein the electrochromic material is 4'-nitrobenzaldehyde, 4-hydroxy anil whose structural formula is:

23. An electro-optic element for controlling the transmission of a beam of light therethrough said element comprising a matrix having therein an electrochromic material and electrode means mounted on opposite faces of said matrix for applying an electric field therebetween and wherein the electrochromic material is 2-hydroxy-7-nitrofluorene whose structural formula is:

24. An electro-optic element for controlling the transmission of a beam of light therethrough said element comprising a matrix having therein an electrochromic material and electrode means mounted on opposite faces of said matrix for applying an electric field therebetween and wherein the electrochromic material is N-acetyl-4-amino-4'-nitrostilbene whose structural formula is:

25. An electro-optic element for controlling the transmission of a beam of light therethrough said element comprising a matrix having therein an electrochromic material and electrode means mounted on opposite faces of said matrix for applying an electric field therebetween and wherein the electrochromic material is N,N-dimethyl-N'-(4-cyanobenzylidene)-4-phenylenediamine whose structural formula is:

26. An electro-optic element for controlling the transmission of a beam of light therethrough said element comprising a matrix having therein an electrochromic material and electrode means mounted on opposite faces of said matrix for applying an electric field therebetween and wherein the electrochromic material is ω-(N'-methylpyridyl-4')-4-methoxystyrene iodide whose structural formula is:

27. An electro-optic element for controlling the transmission of a beam of light therethrough said element comprising a matrix having therein an electrochromic material and electrode means mounted on opposite faces of said matrix for applying an electric field therebetween and wherein the electrochromic material is ω-(N'-methylpyridyl-4')-4-(N-acetylamino)-styrene iodide whose structural formula is:

References Cited by the Examiner
UNITED STATES PATENTS

| | | | |
|---|---|---|---|
| 2,745,316 | 5/1956 | Sziklai | 88—61 |
| 3,175,088 | 3/1965 | Herriott | 88—61 X |
| 3,215,038 | 11/1965 | Heller et al. | 88—61 |
| 3,233,108 | 2/1966 | Rosenblum | 250—199 |
| 3,238,843 | 3/1966 | Heller | 88—61 |

JEWELL H. PEDERSEN, *Primary Examiner.*

DAVID H. RUBIN, *Examiner.*

E. S. BAUER, *Assistant Examiner.*